United States Patent
Kwon et al.

(10) Patent No.: US 9,019,429 B2
(45) Date of Patent: Apr. 28, 2015

(54) APPARATUS FOR AUTOMATIC OBSERVATION OF CLIMATIC CONDITIONS OF THE SKY

(75) Inventors: Jung Jang Kwon, Busan (KR); Bok Soo Jang, Seoul (KR); Chul Gyu Lee, Seoul (KR); Young Jin Choi, Seoul (KR); Geun Hee Lee, Seoul (KR)

(73) Assignees: Newmultitech Co., Ltd, Seoul (KR); Korea Meteorological Administration, Seoul (KR)

( * ) Notice: Subject to any disclaimer, the term of this patent is extended or adjusted under 35 U.S.C. 154(b) by 172 days.

(21) Appl. No.: 13/885,090

(22) PCT Filed: Dec. 9, 2011

(86) PCT No.: PCT/KR2011/009523
§ 371 (c)(1),
(2), (4) Date: May 13, 2013

(87) PCT Pub. No.: WO2012/078010
PCT Pub. Date: Jun. 14, 2012

(65) Prior Publication Data
US 2013/0242180 A1 Sep. 19, 2013

(30) Foreign Application Priority Data
Dec. 9, 2010 (KR) .................. 10-2010-0125638

(51) Int. Cl.
*H04N 5/225* (2006.01)
*G01W 1/00* (2006.01)

(52) U.S. Cl.
CPC *G01W 1/00* (2013.01); *H04N 5/225* (2013.01)

(58) Field of Classification Search
CPC ........... H04N 5/2251–5/2253; H04N 21/4223; A61B 1/04–1/055; G03B 17/02; G03B 17/08; G03B 17/48
See application file for complete search history.

(56) References Cited

U.S. PATENT DOCUMENTS

| | | | | |
|---|---|---|---|---|
| 6,515,705 | B1 * | 2/2003 | Fumio et al. ................ | 348/375 |
| 2004/0041935 | A1 * | 3/2004 | Nagamine et al. .......... | 348/335 |
| 2004/0075736 | A1 | 4/2004 | Yuasa et al. | |
| 2007/0201862 | A1 * | 8/2007 | Van Schaik et al. ........ | 396/427 |
| 2008/0055409 | A1 * | 3/2008 | Mars et al. ................. | 348/143 |
| 2009/0080878 | A1 * | 3/2009 | Cirker ........................ | 396/433 |
| 2009/0140129 | A1 * | 6/2009 | Natori et al. ............... | 250/216 |

FOREIGN PATENT DOCUMENTS

| | | |
|---|---|---|
| JP | 2005325650 A | 11/2005 |
| KR | 200207980 Y1 | 12/2000 |
| KR | 1020100083300 A | 7/2010 |

* cited by examiner

OTHER PUBLICATIONS

International Search Report (Jun. 29, 2012) for corresponding International application No. PCT/KR2011/009523.

*Primary Examiner* — Roberto Velez
*Assistant Examiner* — Tuan Le
(74) *Attorney, Agent, or Firm* — WRB-IP LLP

(57) ABSTRACT

An automatic observation apparatus of sky climate conditions is provided in which an opening and closing device is designed such that a lid moves upward and downward by an elevator so as to open and close the upper portion of an observer and thus, although it snows in winter, the lid moves upward and downward while maintaining a state in which snow is accumulated on the lid, the snow does not collapse due to movement of the lid and does not fall onto a transparent cover of the observer, and thereby obstruction of a visual field of a camera by snow is prevented.

11 Claims, 12 Drawing Sheets

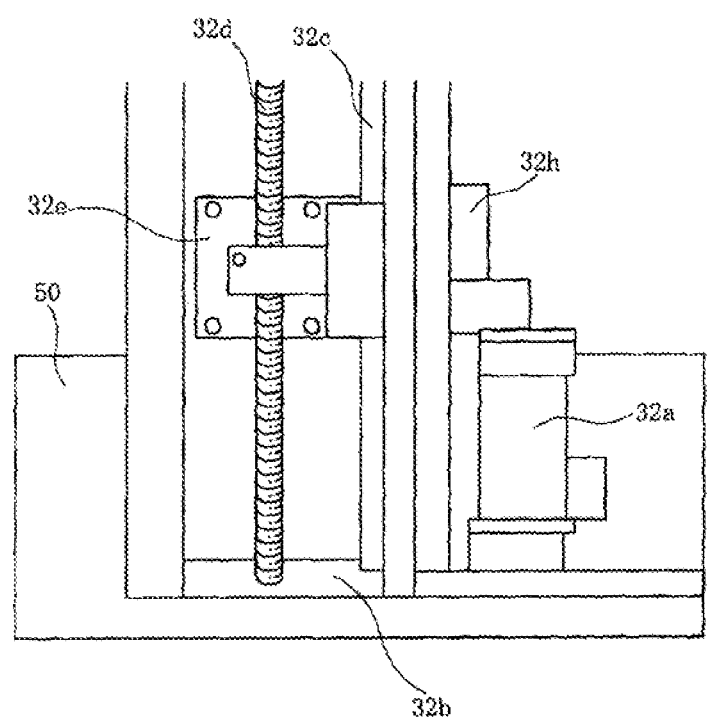

APPARATUS FOR AUTOMATIC OBSERVATION OF CLIMATIC CONDITIONS OF THE SKY

BACKGROUND AND SUMMARY

The present invention relates to an automatic observation apparatus of sky climate conditions, and more particularly to an automatic observation apparatus of sky climate conditions which automatically assures the cleanliness state of an observer.

In general, as observation apparatuses of sky climate conditions, observers, such as a camera and a laser for observing the amount of clouds, the shape of clouds, the height of clouds, and the vector of clouds, are used.

Since such an observer is covered with a transparent cover and installed outdoors, the observer is easily contaminated with rain, snow, dust or excrement of wild animals, such as birds, and may thus have a difficulty in observing sky climate conditions.

Therefore, the present invention has been made in view of the above problems, and it is desirable to provide an automatic observation apparatus of sky climate conditions which automatically handles the cleanliness state of an observer.

It is also desirable to provide an automatic observation apparatus of sky climate conditions in which an opening and closing device is designed such that a lid moves upward and downward by an elevator so as to open and close the upper portion of an observer and thus, although it snows in winter, the lid moves upward and downward while maintaining a state in which snow is accumulated on the lid, the snow does not collapse due to movement of the lid and does not fall onto a transparent cover of the observer, and thereby obstruction of a visual field of a camera by snow may be prevented.

It is also desirable to provide an automatic observation apparatus of sky climate conditions in which both an observer and an opening and closing device are installed on a main box so as to have a simpler structure and to minimize space occupation so that the automatic observation apparatus of sky climate conditions may be simply installed in any place.

It is also desirable to provide an automatic observation apparatus of sky climate conditions in which mounting of an observer on a post installed separately from a main box is useful when there is a broad space on the ground surface, and installation of the observer on the main box is useful when it is difficult to transport and move the automatic observation apparatus of sky climate conditions.8

In accordance with an aspect of the present invention, an automatic observation apparatus of sky climate conditions is provided including an observer provided with a camera mounted on the upper portion of a cylindrical body and covered with a transparent cover, and an opening and closing device controlling a lid opening and closing the upper portion of the observer, wherein the opening and closing device includes an elevator moving the lid upward and downward to open and close the upper portion of the observer.

In an automatic observation apparatus of sky climate conditions in accordance with an aspect of the present invention, an opening and closing device is designed such that a lid moves upward and downward by an elevator so as to open and close the upper portion of an observer and thus, although it snows in winter, the lid moves upward and downward while maintaining a state in which snow is accumulated on the lid, and the snow does not collapse due to movement of the lid and does not fall onto a transparent cover of the observer, thereby preventing obstruction of a visual field of a camera by snow.

In the automatic observation apparatus of sky climate conditions in accordance with an aspect of the present invention, an air blower fan is mounted within the lid, thus rapidly removing dust, moss or moisture accumulated on the transparent cover.

In the automatic observation apparatus of sky climate conditions in accordance with an aspect of the present invention, a drain pipe is arranged in the downward direction from the upper portion of a cylindrical body, thus rapidly discharging water introduced into the observer to the outside.

The automatic observation apparatus of sky climate conditions in accordance with an aspect of the present invention includes a cushion sheet mounted on the upper portion of the body to allow the lid to be elastically mounted on the body, thus damping impact caused when the lid moves downward.

In the automatic observation apparatus of sky climate conditions in accordance with an aspect of the present invention, heating wires are installed at the inside of the lid, thus keeping the dry state of the observer even if it rains or snows.

In the automatic observation apparatus of sky climate conditions in accordance with an aspect of the present invention, both the observer and the opening and closing device are installed on the main box so as to have a simpler structure and to minimize space occupation, thus allowing the automatic observation apparatus of sky climate conditions to be simply installed in any place.

In the automatic observation apparatus of sky climate conditions in accordance with an aspect of the present invention, an elevation shaft moves upward and downward together with an elevation bracket moving upward and downward by interlocking with a long screw rotated in regular and reverse directions by a motor for upward and downward movement, thus naturally assuring upward and downward movement of the lid connected to an arm.

In the automatic observation apparatus of sky climate conditions in accordance with an aspect of the present invention, a motor for circular arc-shaped movement is provided so as to rotate the elevation shaft, moving upward and downward by interlocking with the elevation bracket moving upward and downward according to rotation of the long screw in regular and reverse directions, in regular and reverse directions, and thus, if the elevation shaft moves in the circular arc shape, the lid connected to the arm moves to the left and right at the uppermost position thereof, and the elevation bracket and the elevation shaft move downward along the long screw by rotation of the motor for upward and downward movement in the reverse direction, under the condition that the lid does not move upward from the observer but moves sideward in the circular arc shape, and cause the lid to come down on the main box, thereby allowing the camera of the observer to have an omnidirectional visual field.

In the automatic observation apparatus of sky climate conditions in accordance with an aspect of the present invention, mounting of the observer on a post installed separately from the main box is useful when there is a broad space on the ground surface, and installation of the observer on the main box is useful when it is difficult to transport and move the automatic observation apparatus of sky climate conditions.

BRIEF DESCRIPTION OF DRAWINGS

The above and other objects, features and other advantages of the present invention will be more clearly understood from the following detailed description taken in conjunction with the accompanying drawings, in which:

FIG. 9c is a photograph of the rear surface of the elevator applied to the automatic observation apparatus of sky climate conditions in accordance with the embodiment of the present invention;

DETAILED DESCRIPTION

Figure 1:
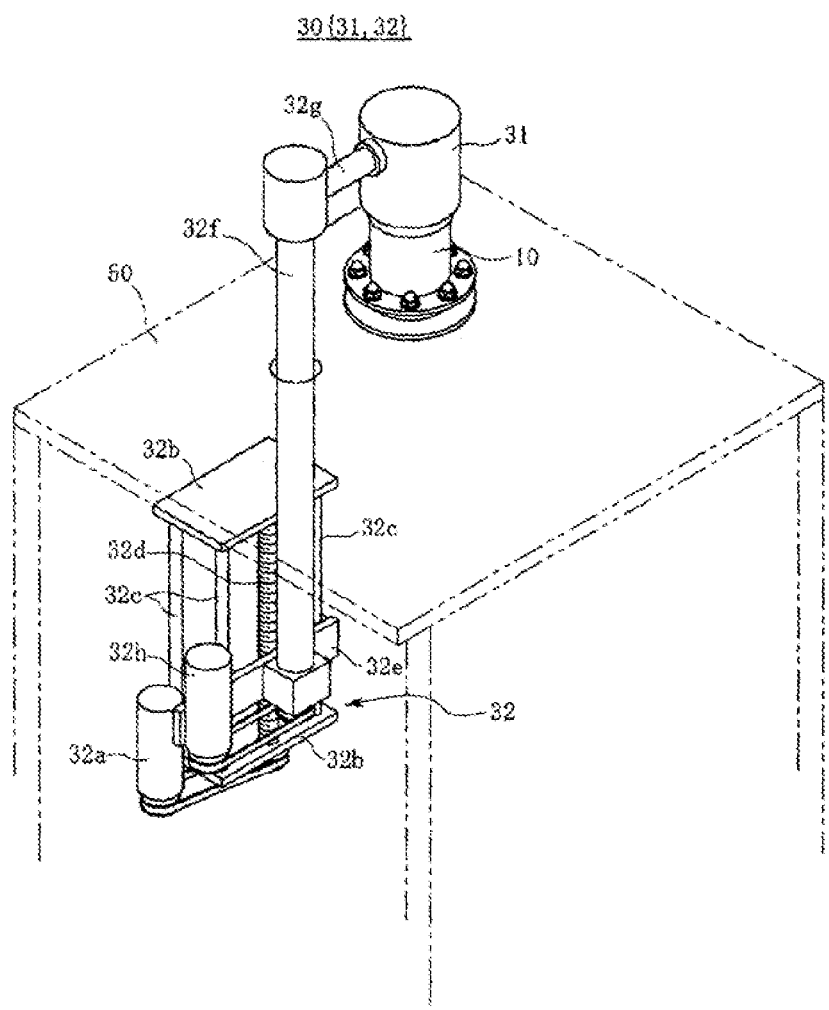
FIG. 1 is a photograph of an automatic observation apparatus of sky climate conditions in accordance with one embodiment of the present invention, taken in the perspective direction.
Figure 2:
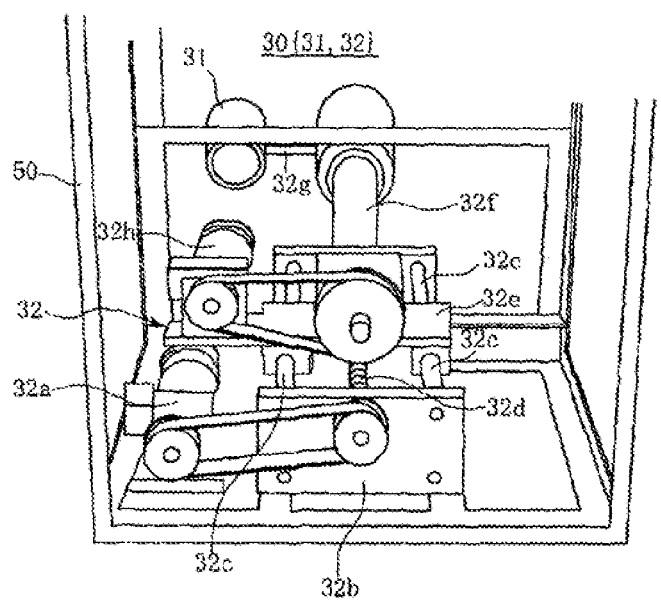
FIG. 2 is a photograph of the automatic observation apparatus of sky climate conditions in accordance with the embodiment of the present invention, taken from the bottom.
Figure 3:
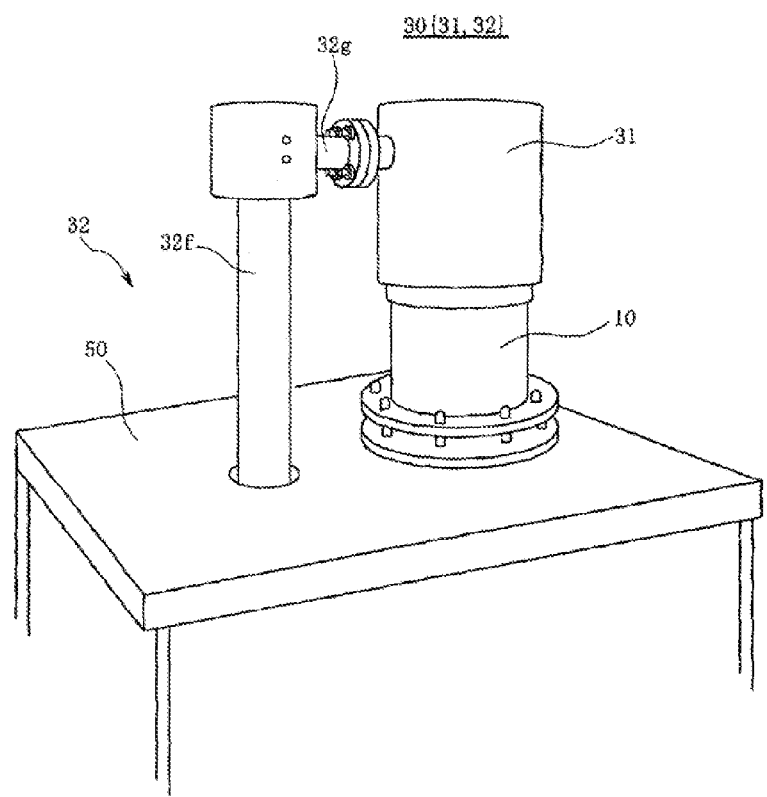
FIG. 3 is a photograph of an observer which is covered with a lid, applied to the automatic observation apparatus of sky climate conditions in accordance with the embodiment of the present invention.
Figure 4:
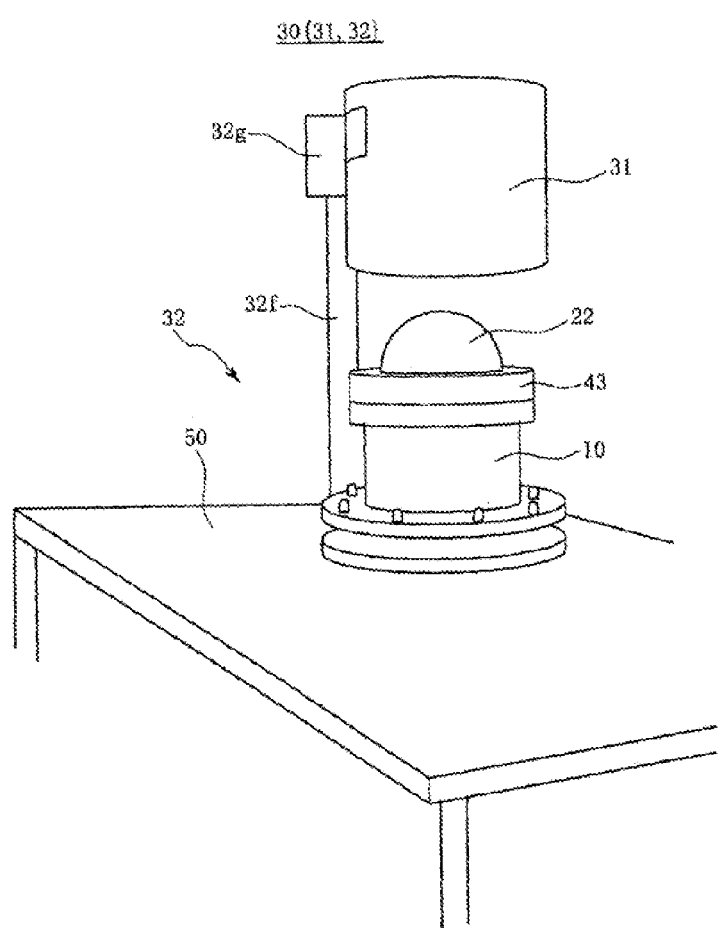
FIG. 4 is a photograph of the observer, from which the lid moves upward, applied to the automatic observation apparatus of sky climate conditions in accordance with the embodiment of the present invention.
Figure 5:
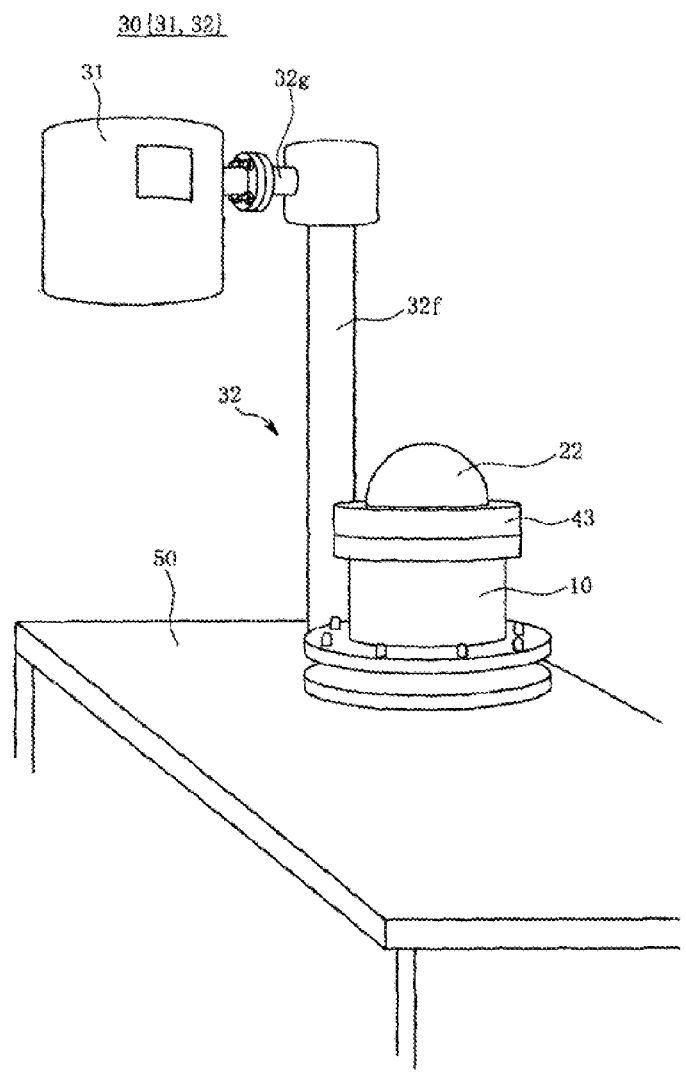
FIG. 5 is a photograph of the observer in which an elevation shaft is moved in an circular arc shape after upward movement of the lid, applied to the automatic observation apparatus of sky climate conditions in accordance with the embodiment of the present invention.
Figure 6:
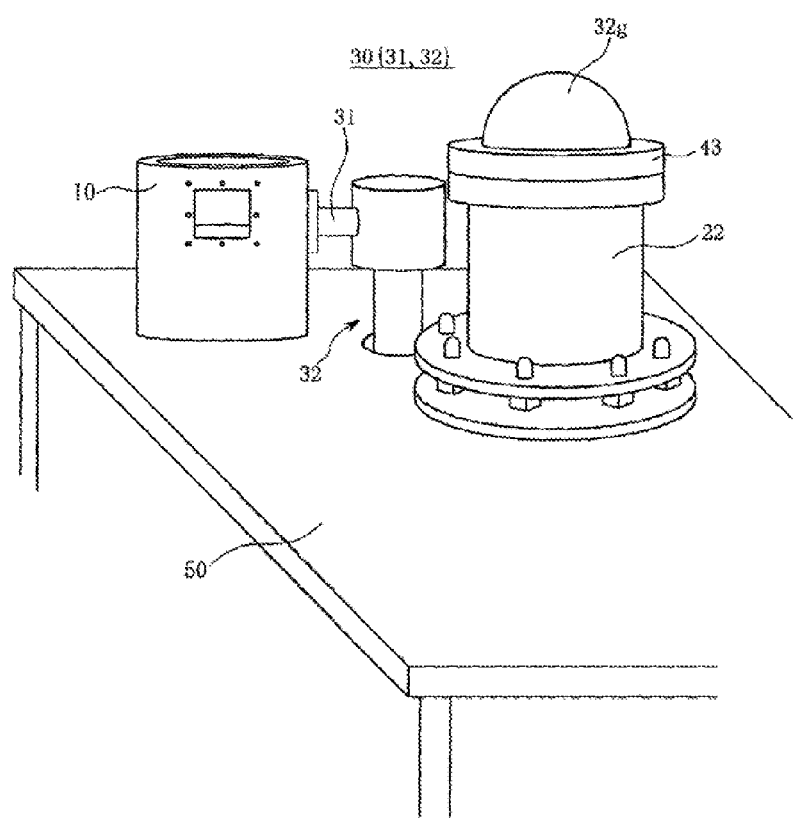
FIG. 6 is a photograph of the observer, from which the lid is removed, applied to the automatic observation apparatus of sky climate conditions in accordance with the embodiment of the present invention.
Figure 7:
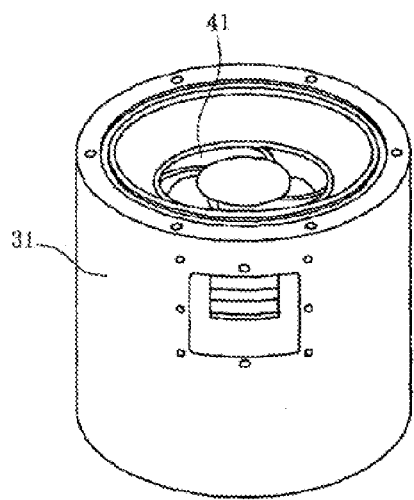
FIG. 7 is a photograph of the lid applied to the automatic observation apparatus of sky climate conditions in accordance with the embodiment of the present invention (although such a photograph representing the upper portion of the lid as being opened, the upper portion of the lid is covered with a cap, as shown in FIG. 8)
Figure 8:
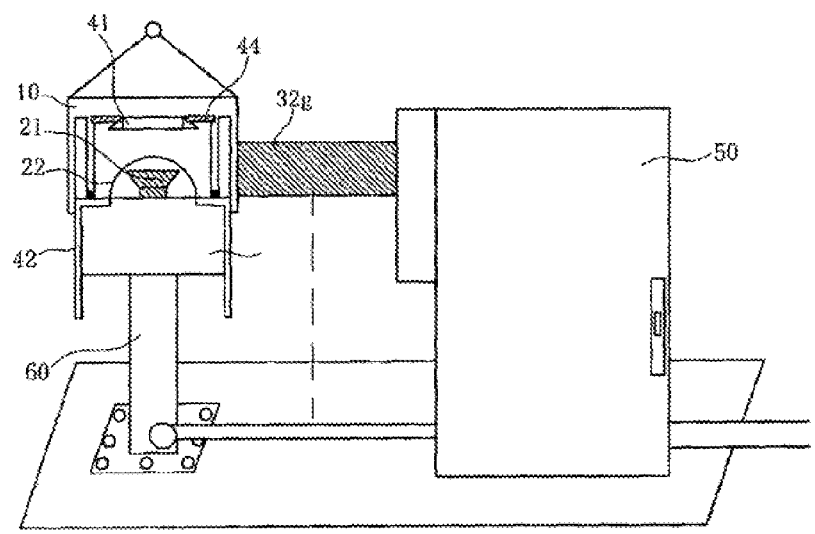
FIG. 8 is a view schematically illustrating the structure of the observer applied to the automatic observation apparatus of sky climate conditions in accordance with the embodiment of the present invention.
Figure 9A:
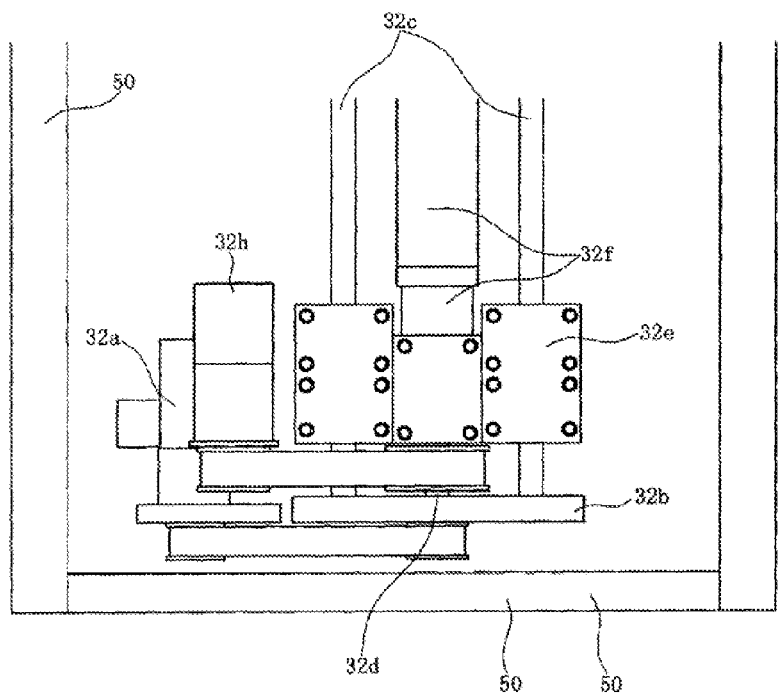
FIGS. 9a and 9b are photographs of the lower portion of an elevator applied to the automatic observation apparatus of sky climate conditions in accordance with the embodiment of the present invention.
Figure 9B:
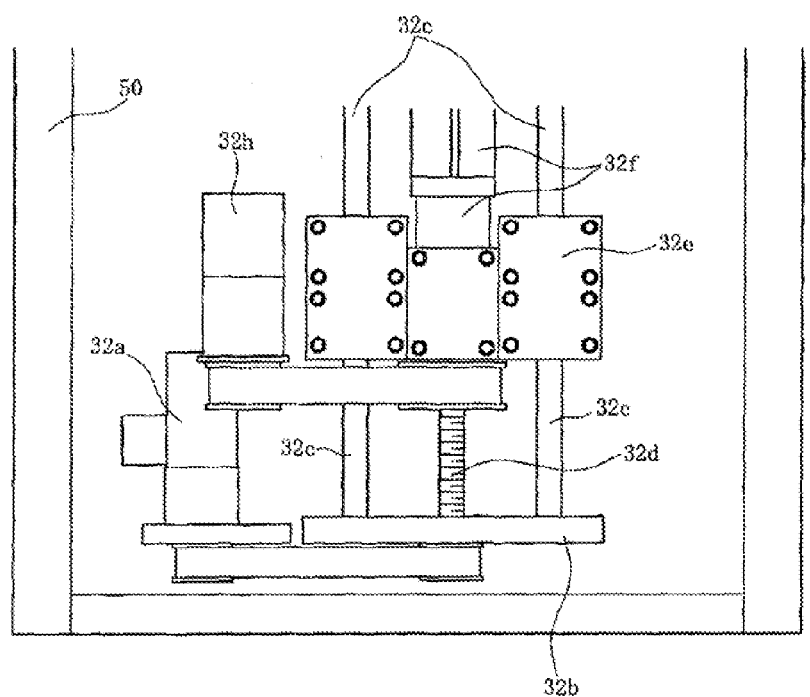

In order to achieve the above and other objects, the present invention provides an automatic observation apparatus of sky climate conditions including an observer provided with a camera mounted on the upper portion of a cylindrical body and covered with a transparent cover, and an opening and dosing device controlling a lid opening and closing the upper portion of the observer, wherein the opening and closing device includes an elevator moving the lid upward and downward to open and close the upper portion of the observer, and the opening and closing device is designed such that the lid moves upward and downward by the elevator so as to open and close the upper portion of the observer and thus, although it snows in winter, the lid moves upward and downward while maintaining a state in which snow is accumulated on the lid, and the snow does not collapse due to movement of the lid and does not fall onto the transparent cover of the observer, thus preventing obstruction of a visual field of a camera by snow.

Now, preferred embodiments of the present invention will be described in detail with reference to the annexed drawings. Various embodiments have been described in the best mode for carrying out the invention, and the objects, features and other advantages of the present invention will be more clearly understood from these embodiments.

An automatic observation apparatus of sky climate conditions in accordance with one embodiment of the present invention, as shown in FIGS. 1 to 8, includes an observer 20 provided with a camera 21 mounted on the upper portion of a cylindrical body 10 and covered with a transparent cover 22, and an opening and closing device 30 controlling a lid 31 opening and closing the upper portion of the observer 20.

Here, the opening and closing device 30 includes an elevator 32 moving the lid 31 upward and downward to open and close the upper portion of the observer 20.

By designing the opening and closing device 30 such that the lid 31 moves upward and downward by the elevator 32 so as to open and close the upper portion of the observer 20, although it snows in winter, the lid 31 moves upward and downward while maintaining a state in which snow is accumulated on the lid 31, the snow does not collapse due to movement of the lid 31 and does not fall onto the transparent cover 22 of the observer 20, and thus obstruction of a visual field of the camera 21 by snow may be prevented.

Further, an air blower fan 41 is mounted within the lid 31 so as to rapidly remove dust, moss or moisture accumulated on the transparent cover 22, a drain pipe 42 is arranged in the downward direction from the upper portion of the body 10 so as to rapidly discharge water introduced into the observer 20 to the outside, and a cushion sheet 43 mounted on the upper portion of the body 10 to allow the lid 31 to be elastically mounted on the body 10 is provided so as to damp impact caused when the lid 31 moves downward. Further, heating wires 44 are installed at the inside of the lid 31 so as to keep the dry state of the observer 20 even if it rains or snows.

In more detail, in the automatic observation apparatus of sky climate conditions in accordance with the embodiment of the present invention, as shown in FIGS. 1 to 9c, the observer 20 is installed on a main box 50 standing erect on the ground surface, and the opening and closing device 30 is installed such that the lid 31 exposed from the upper surface of the main box 50 opens and closes the upper portion of the observer 20 by upward and downward movement of the elevator 32 mounted within the main box 50.

Since both the observer 20 and the opening and closing device 30 are installed dependently on the main box 50, the automatic observation apparatus of sky climate conditions in accordance with the embodiment of the present invention may have a simpler structure and minimize space occupation, thus being simply installed in any place.

Preferably, the elevator 32 includes a motor 32a for upward and downward movement mounted within the main box 50 and rotated in regular and reverse directions, supporters 32b and sliding rods 32c installed in the main box 50, a long screw 32d supported by the supporters 32b and rotated in place in regular and reverse directions by rotation of the motor 32a for upward and downward movement, an elevation bracket 32e supported by the sliding rods 32c and moving upward and downward according to rotation of the long screw 32d in regular and reverse directions, an elevation shaft 32f standing erect on the elevation bracket 32e and moving upward and downward above the main box 50, and an arm 32g fixed to the elevation shaft 32f and connected to the lid 31 (of course, the elevator 32 may include other chains or belts).

The elevation shaft 32f moves upward and downward together with the elevation bracket 32e moving, upward and downward by interlocking with the long screw 2d rotated in regular and reverse directions by the motor 32a for upward and downward movement, thus naturally assuring upward and downward movement of the lid 31 connected to the arm 32g.

Figure 10:
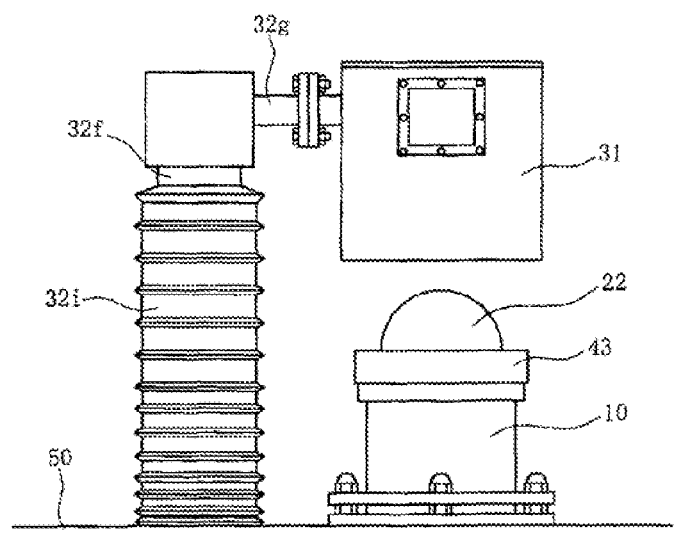
FIG. 10 is a photograph of the elevation shaft which is provided with a bellows, applied, to the automatic observation apparatus of sky climate conditions in accordance with the embodiment of the present invention.

In the automatic observation apparatus of sky climate conditions in accordance with the embodiment of the present invention, as shown in FIG. 10, a bellows 32i which is expandable and contractible in the vertical direction is provided on the outer surface of the elevation shaft 32f exposed from the upper surface of the main box 50 so as to prevent introduction of foreign substances or insects from the outside.

Further, the automatic observation apparatus of sky climate conditions in accordance with the embodiment of the present invention includes a motor 32h for circular arc-shaped movement assembled with the elevation bracket 32e to allow the lid 31 to move in a circular arc shape in the horizontal direction while rotating the elevation shaft 32f in regular and reverse directions.

The motor 32h for circular arc-shaped movement is provided so as to rotate the elevation shaft 32f, moving upward and downward by interlocking with the elevation bracket 32e moving upward and downward according to rotation of the long screw 32d in regular and reverse directions, in regular and reverse directions. Therefore, if the elevation shaft 32f moves in the circular arc shape, the lid 31 connected to the arm 32g may move to the left and right at the uppermost position thereof, and the elevation bracket 32e and the elevation shaft 32f move downward along the long screw 32d by rotation of the motor 32a for upward and downward movement, in the reverse direction under the condition that the lid 31 does not move upward from the observer 20 but moves sideward in the circular arc shape, and thus cause the lid 31 to come down on the main box 50, as shown in FIG. 9c, thereby allowing the camera 21 of the observer 20 to have an omnidirectional visual field.

Figure 11:
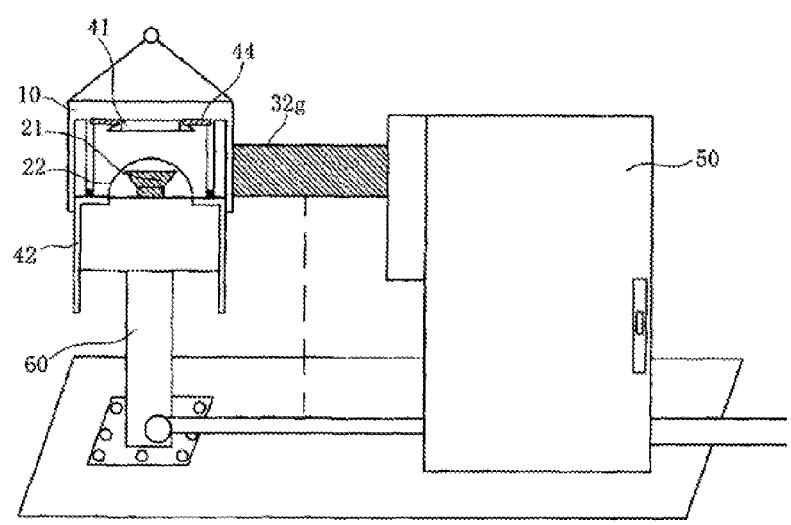
FIG. 11 is a view schematically illustrating the structure of an automatic observation apparatus of sky climate conditions in accordance with another embodiment of the present invention.

In an automatic observation apparatus of sky climate conditions in accordance with another embodiment of the present invention, as shown in FIG. 11, an observer 20 is installed on a post 60 standing erect on the ground surface, and an opening and closing device 30 is installed such that a lid 31 exposed from the upper surface of a main box 50 standing erect on the ground surface opens and closes the upper portion of the observer 20 assembled with the upper portion of the post 60 by upward and downward movement of an elevator 32 mounted within the main box 50.

Mounting of the observer 20 on the post 60 installed separately from the main box 50 is useful when there is a broad space on the ground surface, and installation of the observer 20 on the main box 50 is useful when it is difficult to transport and move the automatic observation apparatus of sky climate conditions.

By designing the opening and closing device 30 such that a lid 31 moves upward and downward by an elevator 32 so as to open and close the upper portion of the observer 20, although it snows in winter, the lid 31 moves upward and downward while maintaining a state in which snow is accumulated on the lid 31, the snow does not collapse due to movement of the lid 31 and does not fall onto a transparent cover 22 of the observer 20, and obstruction of a visual field of a camera 21 by snow may be prevented.

Further, the elevator 32 applied to the automatic observation apparatus of sky climate conditions in accordance with this embodiment of the present invention, as shown in FIGS. 2, 9a, 9b, 9c, 10 and 11, includes a motor 32a for upward and downward movement mounted within the main box 50 and rotated in regular and reverse directions, supporters 32b and sliding rods 32c installed in the main box 50, a long screw 32d supported by the supporters 32b and rotated in place in regular and reverse directions by rotation of the motor 32a for upward and downward movement, an elevation bracket 32e supported by the sliding rods 32c and moving upward and downward according to rotation of the long screw 32d in regular and reverse directions, an elevation shaft 32f standing erect on the elevation bracket 32e and moving upward and downward above the main box 50, and an arm 32g fixed to the elevation shaft 32f and connected to the lid 31 (of course, the elevator 32 may include other chains or belts).

The elevation shaft 32f moves upward and downward together with the elevation bracket 32e moving upward and downward by interlocking with the long screw 2d rotated in regular and reverse directions by the motor 32a for upward and downward movement, thus naturally assuring upward and downward movement of the lid 31 connected to the arm 32g.

Further, the automatic observation apparatus of sky climate conditions in accordance with this embodiment of the present invention includes a motor 32h for circular arc-shaped movement assembled with the elevation bracket 32e to allow the lid 31 to move in a circular arc shape in the horizontal direction while rotating the elevation shaft 32f in regular and reverse directions.

The motor 32h for circular arc-shaped movement is provided so as to rotate the elevation shaft 32f, moving upward and downward by interlocking with the elevation bracket 32e moving upward and downward according to rotation of the long screw 32d in regular and reverse directions, in regular and reverse directions. Therefore, if the elevation shaft 32f moves in the circular arc shape, the lid 31 connected to the arm 32g may move to the left and right at the uppermost position thereof, and the elevation bracket 32e and the elevation shaft 32f move downward along the long screw 32d by rotation of the motor 32a for upward and downward movement in the reverse direction under the condition that the lid 31 does not move upward from the observer 20 but moves sideward in the circular arc shape, and thus cause the lid 31 to face down, thereby allowing the camera 21 of the observer 20 to have an omnidirectional visual field.

The present invention may be applied to a field of observation of various sky climate conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An automatic observation apparatus of sky climate conditions comprising:
   an observer provided with a camera mounted on the upper portion of a cylindrical body and covered with a transparent cover; and
   an opening and closing device controlling a lid opening and closing the upper portion of the observer,
   wherein the opening and closing device includes an elevator moving the lid upward and downward to open and close the upper portion of the observer;
   wherein the observer is installed on a main box standing erect on the ground surface; and the opening and closing device is installed such that the lid exposed from the upper surface of the main box opens and closes the upper portion of the observer by upward and downward movement of the elevator mounted within the main box.

2. The automatic observation apparatus of sky climate conditions according to claim 1, further comprising an air blower fan mounted within the lid.

3. The automatic observation apparatus of sky climate conditions according to claim 1, further comprising a drain pipe arranged in the downward direction from the upper portion of the body.

4. The automatic observation apparatus of sky climate conditions according, to claim 1, further comprising a cushion sheet mounted on the upper portion of the body to allow the to be elastically mounted on the body.

5. The automatic observation apparatus of sky climate conditions according to claim 1, further comprising heating wires installed at the inside of the lid.

6. The automatic observation apparatus of sky climate conditions according to claim 1, wherein the elevator includes:
   a motor for upward and downward movement mounted within the main box and rotated in regular and reverse directions;
   supporters and sliding rods installed in the main box; a long screw supported by the supporters and rotated in place in regular and reverse directions by rotation of the motor for upward and downward movement;
   an elevation bracket supported by the sliding rods and moving upward and downward according to rotation of the long screw in regular and reverse directions;
   an elevation shaft standing erect on the elevation bracket and moving upward and downward above the main box; and an arm fixed to the elevation shaft and connected to the lid.

7. The automatic observation apparatus of sky climate conditions according to claim 6, wherein a bellows which is expandable and contractible in the vertical direction is provided on the outer surface of the elevation shaft exposed from the upper surface of the main box.

8. The automatic observation apparatus of sky climate conditions according to claim 1, further comprising a motor for circular arc-shaped movement assembled with the elevation bracket and rotating the elevation shaft in regular and reverse directions to allow the lid to move in a circular arc shape in the horizontal direction.

9. The automatic observation apparatus of sky climate conditions according to claim 1, wherein:
   the observer is installed on a post standing erect on the ground surface; and
   the opening and closing device is installed such that the lid exposed from the upper surface of a main box standing erect on the ground surface opens and closes the upper portion of the observer assembled with the upper portion of the post by upward and downward movement of the elevator mounted within the main box.

10. The automatic observation apparatus of sky climate conditions according to claim 9, wherein the elevator includes:
   a motor for upward and downward movement mounted within the main box and rotated in regular and reverse directions;
   supporters and sliding rods installed in the main box;
   a long screw supported by the supporters and rotated in place in regular and reverse directions by rotation of the motor for upward and downward movement;
   an elevation bracket supported by the sliding rods and moving upward and downward according to rotation of the long screw in regular and reverse directions;
   an elevation shaft standing erect on the elevation bracket and moving upward and downward above the main box; and
   an arm fixed to the elevation shaft and connected to the lid.

11. The automatic observation apparatus of sky climate conditions according to claim 10, further comprising a motor for circular arc-shaped movement assembled with the elevation bracket and rotating the elevation shaft in regular and reverse directions to allow the lid to move in a circular arc shape in the horizontal direction.

\* \* \* \* \*